(12) United States Patent
Deibler et al.

(10) Patent No.: US 9,344,288 B2
(45) Date of Patent: May 17, 2016

(54) EXTEMPORANEOUS AWARENESS OF RICH PRESENCE INFORMATION FOR GROUP MEMBERS IN A VIRTUAL SPACE

(75) Inventors: Danielle Deibler, San Francisco, CA (US); David Jared, Denver, CO (US)

(73) Assignee: Adobe Systems Incorporated, San Jose, CA (US)

( * ) Notice: Subject to any disclaimer, the term of this patent is extended or adjusted under 35 U.S.C. 154(b) by 1147 days.

(21) Appl. No.: 12/239,672

(22) Filed: Sep. 26, 2008

(65) Prior Publication Data

US 2014/0245162 A1    Aug. 28, 2014

Related U.S. Application Data

(60) Provisional application No. 60/976,293, filed on Sep. 28, 2007.

(51) Int. Cl.
*G06F 3/00* (2006.01)
*H04L 12/18* (2006.01)
*H04N 7/15* (2006.01)
(Continued)

(52) U.S. Cl.
CPC .......... *H04L 12/1822* (2013.01); *G06Q 10/103* (2013.01); *H04N 7/148* (2013.01); *H04N 7/15* (2013.01)

(58) Field of Classification Search
CPC ........ H04N 7/148; H04N 7/15; G06Q 10/103
USPC ........... 345/418–475; 709/201–203; 715/733, 715/734, 737, 751, 753, 759, 854–855, 719, 715/756
See application file for complete search history.

(56) References Cited

U.S. PATENT DOCUMENTS 6,119,147 A * 9/2000 Toomey ............... G06Q 10/109 709/204
6,353,448 B1 * 3/2002 Scarborough et al. ........ 715/744
(Continued)

FOREIGN PATENT DOCUMENTS

EP           696018        2/1996
EP           1498164       1/2005

OTHER PUBLICATIONS

Office Action dated Sep. 29, 2009 in U.S. Appl. No. 11/611,019.
(Continued)

*Primary Examiner* — Ryan Pitaro
(74) *Attorney, Agent, or Firm* — Kilpatrick Townsend & Stockton LLP (57) ABSTRACT

Extemporaneous awareness of rich presence information among members of a peer group connected to a communication network is described. As members of the peer group log onto the network, identification information is examined to determine membership in any defined groups. For each group member found, rich presence information, which includes at least the visual context information identifying the activity that the group member is currently displaying on his or her device, and navigational information providing a virtual path to that activity, is extemporaneously broadcast to each other online member of the peer group unsolicited by these group members. This rich presence information is then used to display what every other member is doing on each member's device. By selecting the display corresponding to a particular activity, the selecting member may join that virtual space with the other corresponding member via the navigational information.

24 Claims, 6 Drawing Sheets

(51) Int. Cl.
*H04N 7/14* (2006.01)
*G06Q 10/10* (2012.01)

(56) References Cited

U.S. PATENT DOCUMENTS

| | | | |
|---|---|---|---|
| 6,646,673 B2* | 11/2003 | Caviedes et al. | 348/14.07 |
| 6,789,120 B1 | 9/2004 | Lee et al. | |
| 6,985,478 B2 | 1/2006 | Pogossiants et al. | |
| 7,003,463 B1 | 2/2006 | Maes et al. | |
| 7,065,070 B1 | 6/2006 | Chang | |
| 7,095,733 B1 | 8/2006 | Yariagadda et al. | |
| 7,471,644 B2 | 12/2008 | Sakai | |
| 7,512,656 B2 | 3/2009 | Tsuchiya | |
| 7,703,013 B1* | 4/2010 | Bauermeister et al. | 715/255 |
| 8,031,631 B2 | 10/2011 | Sakai | |
| 8,397,168 B2* | 3/2013 | Leacock et al. | 715/757 |
| 2003/0097661 A1 | 5/2003 | Li et al. | |
| 2003/0233650 A1 | 12/2003 | Zaner et al. | 725/32 |
| 2004/0010720 A1* | 1/2004 | Singh et al. | 713/201 |
| 2004/0032400 A1 | 2/2004 | Freeman et al. | |
| 2005/0166154 A1* | 7/2005 | Wilson et al. | 715/751 |
| 2006/0036959 A1 | 2/2006 | Heatherly et al. | |
| 2006/0041686 A1 | 2/2006 | Caspi et al. | |
| 2006/0122917 A1 | 6/2006 | Lokuge | G06F 17/30861 705/27.1 |
| 2006/0147891 A1* | 7/2006 | Dreyfous et al. | 434/362 |
| 2006/0193295 A1 | 8/2006 | White et al. | |
| 2006/0242581 A1* | 10/2006 | Manion et al. | 715/733 |
| 2006/0265508 A1 | 11/2006 | Angel et al. | |
| 2007/0004393 A1 | 1/2007 | Forsberg et al. | |
| 2007/0115940 A1 | 5/2007 | Kamen et al. | |
| 2007/0162487 A1 | 7/2007 | Frailey | |
| 2007/0208806 A1 | 9/2007 | Mordecai et al. | |
| 2008/0028323 A1* | 1/2008 | Rosen | G06Q 10/10 715/752 |
| 2008/0040441 A1* | 2/2008 | Maes | 709/207 |
| 2008/0055306 A1 | 3/2008 | Kwok et al. | |
| 2008/0134063 A1* | 6/2008 | Volach | 715/762 |
| 2008/0144603 A1 | 6/2008 | Chouksey | |
| 2008/0144604 A1 | 6/2008 | Sharma | |
| 2008/0256170 A1* | 10/2008 | Hayashi et al. | 709/201 |
| 2008/0270910 A1* | 10/2008 | Lukasik et al. | 715/740 |
| 2008/0313550 A1* | 12/2008 | Shiga et al. | 715/753 |
| 2009/0019367 A1* | 1/2009 | Cavagnari et al. | 715/716 |
| 2009/0030999 A1 | 1/2009 | Gatzke et al. | |
| 2009/0113389 A1 | 4/2009 | Ergo et al. | |
| 2009/0210802 A1* | 8/2009 | Hawkins | G06F 3/0481 715/753 |
| 2009/0300520 A1* | 12/2009 | Ashutosh et al. | 715/756 |
| 2010/0094859 A1* | 4/2010 | Gupta | 707/709 |
| 2010/0122212 A1* | 5/2010 | Boudalier | 715/811 |
| 2010/0122334 A1 | 5/2010 | Stanzione et al. | |
| 2010/0192072 A1* | 7/2010 | Spataro et al. | 715/753 |
| 2010/0235761 A1* | 9/2010 | Blagsvedt et al. | 715/752 |
| 2010/0241972 A1* | 9/2010 | Spataro et al. | 715/753 |
| 2011/0016408 A1* | 1/2011 | Grosz et al. | 715/745 |
| 2011/0072355 A1* | 3/2011 | Carter et al. | 715/738 |
| 2012/0196263 A1* | 8/2012 | Prevuznak et al. | 434/350 |

OTHER PUBLICATIONS

Contact At Once!, webpage; archived Jun. 16, 2006; retrieved Oct. 28, 2010, 3 pages.
FierceVoIP, Can VoIP save social networking?; Oct. 19, 2006; retrieved Oct. 27, 2010, 2 pages.
MozIAX; moziax.mozdev.org; archived Oct. 5, 2006; retrieved Oct. 26, 2010, 2 pages.
Uyless Black; Voice Over IP; Publisher: Prentice Hall, Aug. 4, 1999, 328 Pages, excerpt 11 pages.
Arrington, Michael, Ether pay-per-call launches for public use; Jun. 22, 2006; retrieved Oct. 27, 2010, 3 pages.
fiercevoip.com; Jaxtr social network VoIP tool bows: Do you care?; Dec. 14, 2006, 2 pages.
Gonzalez, Nick, Wengo Video Chat for Bloggers; Dec. 21, 2006; retrieved Oct. 27, 2010, 3 pages.
Keating, Tom, Wengo releases Flash VoIP client; Dec. 18, 2006; retrieved Oct. 27, 2010, 6 pages.
Luca Filigheddu, Firefox VoIP: Abbeynet;, Jun. 6, 2006; retrieved Oct. 27, 2010 , 14 pages.
Malik, OM, Flash in the VoIP Pan; Sep. 22, 2006; retrieved Oct. 27, 2010, 8 pages.
Veer, Vander E., Flash 8: The Missing Manual; Publisher: O'Reilly Media, Inc., Mar. 22, 2006, 464 Pages, excerpt 6 pages.
Wengo Visio, translated blog post, retrieved Oct. 27, 2010, Dec. 11, 2006, 9 pages http://www.genbeta.com/web/wengo-vision-videoconferencias-para-tu-web-mediante-unwidget.
Notice of Allowance dated Dec. 9, 2010 in U.S. Appl. No. 11/611,019.
Advisory Action dated Jan. 27, 2011 in U.S. Appl. No. 11/611,046.
Office Action dated Nov. 15, 2010 in U.S. Appl. No. 11/611,046.
Macromedia FLASH Media Server 2 Client-Side ActionScript Language Reference for Flash Media Server 2 (available at http:download.macromedia.com/pub/documentation/en/flashmediaserver/2/flashmediaserver_cs_asd.pdf) (last accessed Dec. 14, 2006).
Macromedia FLASH Media Server 2 Server-Side ActionScript Language Reference, (available at http://download.macromedia.com/pub/documentation/en/flashmediaserver/2/flashmediaserver_ss_asd.pdf) (last accessed Dec. 14, 2006).
Macromedia Breeze, Breeze Integration Guide, (available at http://download.macromedia.com/pub/documentation/en/breeze/5/brze5_integration.pdf) (last accessed Dec. 14, 2006).
Macromedia Breeze, Breeze Meeting User Guide for Meeting Hosts and Presenters, (available at http://download.macromedia.com/pub/documentation/en/breeze/5/meeting_ug_presenters.pdf) (last accessed Dec. 14, 2006).
U.S. Appl. No. 11/611,019, filed Dec. 14, 2006.
U.S. Appl. No. 11/611,046, filed Dec. 14, 2006.
U.S. Appl. No. 12/038,656, filed Feb. 27, 2008.
Conaito VoIP Standard SDK, http://web.archive.org/web/20061125011713/www.conaito.com/voip_standard_ueberblick.asp, archived Nov. 25, 2006 and retrieved May 17, 2010.
CounterPath. eyeBeam 1.11 User Guide, http://web.archive.org/web/20051215115317/www.counterpath.com/docs/eyeBeam1.11UserGuide.pdf, archived Dec. 15, 2005 and retrieved May 14, 2010.
Definition of SDK, http ://searchcio-midmarket.techtarget.com/sDefinition/0,,sid183_gci213603,00.html, updated Sep. 27, 2005 retrieved May 17, 2010.
EyeBeam Software Development Kit (SDK) http://web.archive .org/web/20051217093310/ www.counterpath.com/index.php?menu=eyeBeamSDK, archived Dec. 17, 2005 linked to eyeBeam SDK Product Specification, http://web.archive.org/web/20051205013738/www.counterpath.com/docs/eyebeam.pdf, archived Dec. 5, 2005, both retrieved May 14, 2010.
Office Action dated Apr. 5, 2010 in U.S. Appl. No. 11/611,019.
Office Action dated Jul. 23, 2010 in U.S. Appl. No. 11/611,019.
Office Action dated May 21, 2010 in U.S. Appl. No. 11/611,046.
Non Final Office Action in related U.S. Appl. No. 11/611,046 dated Nov. 23, 2012, 25 pages.
Non Final Office Action in related U.S. Appl. No. 12/038,656, dated Nov. 5, 2012, 25 pages.
Final Office Action in related U.S. Appl. No. 12/038,656 dated Jul. 19, 2012, 24 pgs.
Non Final Office Action in related U.S. Appl. No. 12/038,656 dated Feb. 15, 2012.

* cited by examiner

EXTEMPORANEOUS AWARENESS OF RICH PRESENCE INFORMATION FOR GROUP MEMBERS IN A VIRTUAL SPACE

CROSS-REFERENCE TO RELATED APPLICATIONS

This application claims priority to U.S. Provisional Patent Application Ser. No. 60/976,293 titled "SYSTEMS AND METHODS FOR AN ENHANCED SHARED EXPERIENCE" filed Sep. 28, 2007, the full disclosure of which is hereby incorporated herein by reference. This application is also related to and commonly assigned U.S. patent application Ser. No. 12/038,656 titled "SYSTEMS AND METHODS FOR ENABLING COMMUNICATION BETWEEN USERS OF COMMON VIRTUAL SPACES" filed Feb. 27, 2008, the disclosure of which is hereby incorporated herein by reference.

TECHNICAL FIELD

The present disclosure relates, in general, to electronic collaboration and, more specifically, to extemporaneous awareness of rich presence information for group members in a virtual space.

BACKGROUND

Collaboration is a work concept that has been around likely since the beginning of the human race. People working together on a common project, common goal, or the like typically provides a more efficient means to get the thing done more quickly or, perhaps, allows the undertaking of a bigger task than only one person could ordinarily handle by him- or herself.

With the advent of computers and the advancement of technologies in networking and transmission bandwidth, electronic collaboration has extended this collaborative concept beyond the traditional physical collaboration or asynchronous remote collaboration. Now, people from various parts of the globe may participate in the same meeting at the same time. These electronic meeting rooms or virtual spaces are electronically defined connections between each participant of the meeting. Examples of modern electronic meeting applications are Adobe Systems Incorporated's ACROBAT® CONNECT™, WebEx Communications, Inc.'s WEBEX, and the like. In some implementations, electronic collaboration may be driven or hosted by a centralized server. In such cases, the virtual space is managed by the centralized sever, which controls the media being transmitted between the various meeting participants. The centralized server may transmit the screen shots of any visual presentations being displayed, any audio that is being transmitted, other types of data or files, or the like. The centralized server manages the collaboration or meeting, ensuring that each meeting participant views the same or similar collaborative display. If screen sharing is being used, the visual presentation and actions of the person who's screen is being shared is captured and then transmitted to the other meeting participants for each participant to see.

Such screen-sharing applications have been developed to enable one user to share the output of their computer screen with other users. Users generally pre-arrange or schedule an online meeting and invite the various participants, typically providing the participants appropriate log-in information for accessing the electronic meeting space at a pre-scheduled date and time. At the scheduled date/time the invited participants may access a given website and input their log-in information to access the electronic meeting space. Thus, the participants all access a common virtual space (e.g., an online electronic meeting space) by which they gain access to the information being shared by other participants. During the electronic meeting, a listing of the participants present in the meeting (i.e., present in the common virtual meeting space) may be presented to each of the participants. The participants may exchange information with each other during the electronic meeting, such as by exchanging chat messages or the like, within the common virtual meeting space that they are all accessing. In some instances, one participant's screen (e.g., the meeting host's screen) may be shared with the other participants via the common virtual meeting space, whereby the other participants are able to view (on their respective computer screens) information (e.g., a presentation, a document in a word processor, or the like) that is being presented on the shared screen (e.g., the host's screen).

Additional embodiments of electronic collaboration may be implemented using peer-to-peer (P2P) technology. In P2P technology, there is typically no centralized server that manages the electronic meeting. Instead, each of the individual client computers of the meeting participants handles its part of the entire communication and networking needs of the collaborating group. This is typically accomplished using multiple client-side software applications which establish and maintain the communication sessions and all of the data transmission between the other clients. Again, similar material is transmitted, exchanged, and/or shared between the various meeting participants.

Electronic collaboration environments typically include whiteboard functionality, which allows all participants to be involved in editing a particular matter. Shared screens may also often allow the various users to assist in editing documents, coding, and the like. Thus, true collaboration may occur through these electronic meetings and virtual spaces in which all participants are allowed access to the same information viewable and editable through the shared, virtual space.

Another collaborative-type virtual space has been defined in modern social networking applications. Instant messaging (IM) services, which may typically be considered the precursor to more advanced social networking applications, allow people to send instant communications to a group of known "friends" or "buddies" who are also logged into the particular IM service. Services, such as AOL, L.L.C.'s AOL INSTANT MESSENGER™ (AIM), Microsoft Corporation's, MSN MESSENGER™, Yahoo, Inc.'s YAHOO® INSTANT MESSENGER™, provide virtual locations for multiple people to interact instantly and presence information about friends or buddies in a defined group. Presence information typically provides an indicator as to whether or not a person, who is in someone's friend or buddy list, is online or not. Additional features have been added to some of these IM services that allow the individual user to enter additional information with regard to what that person was doing at any given time. Thus, any connected person may be able to know when any of his or her buddies is online and available for communication and may be able to discern what that person is doing, if that person had entered such information.

Social networking applications have recently begun to advance into a more rich experience through Web applications such as Fox Interactive Media's MYSPACE.COM™, Facebook Inc.'s, FACEBOOK®, and the like. In these social networking applications, each member is able to create a homepage with videos, pictures, web log (blog) entries, and the like. Members become friends with other members allowing for shared access to information, instant messaging and other collaborative-type experiences.

Other social networking applications provide for sharing information about user activities among peer group members in certain limited contexts. As one example, members of a peer group may subscribe to a service to receive informational updates of user activities that these users have input for themselves. For instance, Obvious L.L.C.'s TWITTER™ service provides a social networking and micro-blogging service that allows users to send "updates" (or "tweets") to the TWITTER™ website, via short message service (SMS), instant messaging, or a third-party application. Thus, a user can send the TWITTER™ website a text-based post (up to 140 characters long) in which the user describes his or her activity. The posted updates are displayed on the user's profile page and delivered to other users who have signed up to receive them. While delivery to everyone signed up for a given user is the default, the sender can restrict delivery to those in his or her circle of friends. Users can receive the textual updates via the TWITTER™ website, instant messaging, SMS, RSS, email or through a separate application. As an example, a user may input and send (or "post") a text message to TWITTER™ that the user has arrived at an airport, whereby the textual posting that describes the user's activity of arriving at the airport may be communicated to other subscribing users, such as the sender's friends, family, coworkers, or the like. Thus, the TWITTER™ service requires users to actively type in a textual description of their activities, and TWITTER™ provides a textual communication describing the user activity to other parties.

SUMMARY

The present disclosure is directed to a systems, methods, and computer program products that provide extemporaneous awareness of rich presence information among members of a peer group connected to a communication network. As members of the peer group log onto the network, identification information is examined to determine membership in any defined groups. For each group member found, rich presence information, which includes at least the visual context information identifying the activity that the group member is currently displaying on his or her device, and navigational information providing a virtual path to that activity, is broadcast to each other online member of the peer group. This rich presence information is then used to display what every other member is doing on each member's device. By selecting the display corresponding to a particular activity, the selecting member may join that virtual space with the other corresponding member via the navigational information.

Additional representative embodiments are directed to methods that include receiving identification information from one or more client devices coupled to a communication network, analyzing grouping rules to identify one or more members of a peer group from the one or more client devices based on the identification information, receiving rich presence information from each of the members coupled to the communication network, and, unsolicited by the members, extemporaneously broadcasting the rich presence information from each of the one of the one or more members to each other of the one or more members for display on their associated client devices such that each of members views the visual context information for each of the other members. The rich presence information is made up of at least two or more of an online indicator identifying whether the members are coupled to the communication network, visual context information representing operational elements and actions displayed on a display of the member client devices, and navigational information representing a path to a virtual location for the operational elements and actions.

Still further representative embodiments are directed to computer program products having a computer readable medium with computer program logic recorded thereon. The computer program product has code for receiving identification information from one or more client devices coupled to a communication network, code for analyzing grouping rules to identify one or more members of a peer group from the client devices based on the identification information, code for receiving rich presence information from each of the members coupled to the communication network, and code, of which execution is unsolicited by the members, for extemporaneously broadcasting the rich presence information associated with each of the members to each other of the members for display on one or more associated member devices, such that each of the members views visual context information from the rich presence information for each other of the members.

Further representative embodiments are directed to methods that include determining two or more peer group members from a plurality of client devices coupled to a communication network, receiving rich presence information from the two or more peer group members, and, without request from the peer group members, extemporaneously broadcasting the rich presence information to each of the other peer group members such that each peer group member views the visual context information associated with each other peer group member. The rich presence information includes visual context information representing operational elements and actions displayed on a display of the two or more peer group members and navigational information representing a virtual path for the operational elements and actions.

Additional representative embodiments are directed to computer-implemented systems made up of a processor, memory configured to operate with the processor, a plurality of client communication modules configured for installation on a plurality of group member devices, and a collaboration application stored on the memory and executable by the processor. When the collaboration application is executed by the processor, it creates a collaboration system that includes a peer group identifier component configured to determine the plurality of group member devices based on identification input received from a plurality of client devices and a connection manager component configured to manage communication of rich client information between the plurality of group member devices, where the rich client information comprises visual context information representing operational elements and actions displayed on a display of the plurality of group member devices and navigational information representing a virtual path for the operational elements and actions.

The foregoing has outlined rather broadly the features and technical advantages of embodiments in order that the detailed description that follows may be better understood. Additional features and advantages will be described hereinafter which form the subject of the claims. It should be appreciated by those skilled in the art that the conception and specific embodiment disclosed may be readily utilized as a basis for modifying or designing other structures for carrying out the same purposes. It should also be realized by those skilled in the art that such equivalent constructions do not depart from the spirit and scope of the concepts as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the claims.

BRIEF DESCRIPTION OF THE DRAWINGS

For a more complete understanding of the present disclosure, reference is now made to the following descriptions taken in conjunction with the accompanying drawing, in which.

DETAILED DESCRIPTION

Figure 1A:
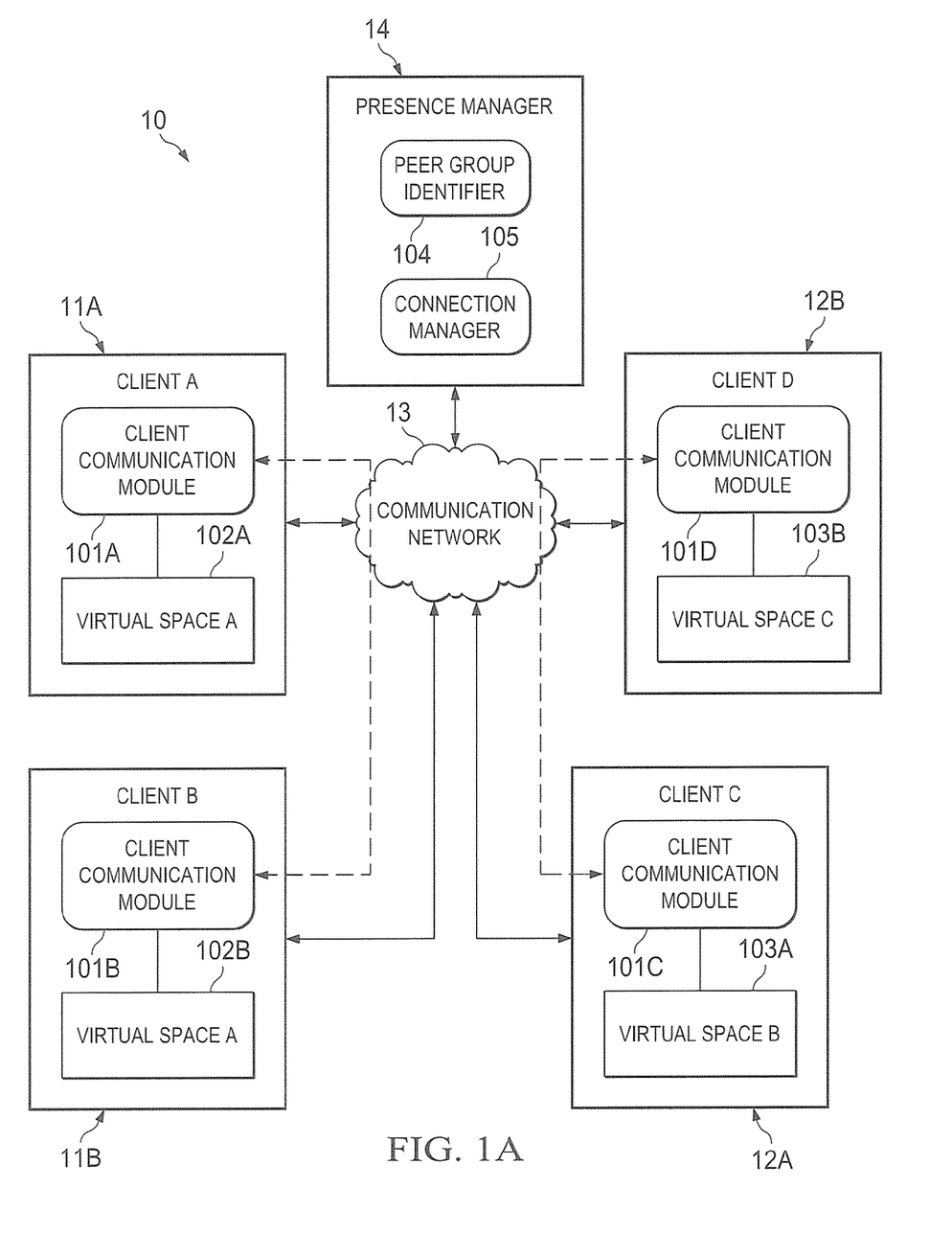
FIG. 1A shows a block diagram of an exemplary system according to one embodiment.

FIG. 1A shows a block diagram of extemporaneous collaboration system (ECS) 10 according to one embodiment. ECS 10 comprises client computing devices 11A, 11B, 12A, and 12B that are communicatively coupled to communication network 13 and are each within the same defined peer group. ECS 10 further comprises presence manager 14 that is communicatively coupled to communication network 13 and maintains various and multiple lists of peer groups along with each individual member of those groups. Communication network 13 may be the Internet or other Wide Area Network (WAN), an Intranet, a Local Area Network (LAN), a public-switched telephony network, a wireless network, and/or any other network that permits computing devices to communicate information to each other as described herein.

Client computing devices 11A, 11B, 12A, and 12B each include client communication modules 101A-101D, respectively. As described further herein, such client communication modules are operable to communicate information to presence manager 14, as well as communicate with other peer group members with whom the client computing device is communicatively connected. Communication modules 101A-101D are implemented on each client computing device 11A, 11B, 12A, 12B, which provides logic for enabling communication between the clients who are determined by presence manager 14 as being members of a particular peer group. Communication modules 101A-101D may employ any suitable communication logic, including universal or open source modules that enable ready adoption by many different types of client devices. In certain embodiments, such communication modules 101A-101D may be implemented using Adobe Systems Incorporated's FLASH® player, ADOBE® AIR™, ADOBE® MEDIA PLAYER, or the like, but any implementation of a communication module that functions substantially as described herein is within the scope of the present disclosure.

As further illustrated in the example of FIG. 1A, each of client computing devices 11A, 11B, 12A, and 12B are accessing at least one virtual space. For instance, client computing devices 11A and 11B are accessing separate instances of virtual space A 102A and 102B, while client computing devices 12A and 12B are accessing instances of virtual spaces B 103A and C 103B, respectively. As described further herein, each virtual space may be predefined as corresponding to any one or more software applications (which may be executing locally on a client computing device or a web-based application (e.g., websites), as examples). For instance, a given virtual space may be an instance of a particular software environment (e.g., software program, web page, or the like), or the given virtual space may be predefined as a virtual region that encompasses separate instances of one or more software environments.

As described further herein, the presence management solution of certain embodiments is not limited in application to communication between parties accessing websites or any specific virtual space (such as a common electronic meeting space), but may likewise be applied to enable communication between parties who are accessing various different types of virtual spaces, including as examples separate applications executing locally on different client computing devices. Thus, users who are accessing a particular type of local application (e.g., a given software development application, a given animation-editing application, a given image-editing application, a given software gaming application) on a client computing device (e.g., a personal computer (PC), laptop computer, personal digital assistant (PDA), mobile telephone, set-top or handheld gaming console, etc.) may be extemporaneously connected to each other without the necessity to set up an electronic meeting, communicate the time and access information for the meeting, and then attend at the particular time.

Moreover, each user within any particular peer group is extemporaneously aware of the rich presence information of any other active or "online" (e.g., signed onto and/or actively using a computing device, and/or accessing a particular virtual space/region) member of the peer group. Rich presence information is information that includes the typical presence information, such as an online indicator, which indicates whether or not a user is actively online at any give time, but also includes additional rich information that defines both the visual and operational context of each peer group member, including the operational elements and actions occurring with the user's activity, and also navigational path information which would allow one of the other peer group members to navigate to the virtual space or virtual location described in the rich presence information.

For example, virtual space C, which client computing device 12B is accessing, is an instance of eBay, Inc.'s, EBAY® online auction service. In particular, the user on client computing device 12B is viewing a number of golf club drivers. When client computing device 12B becomes online, each of the client computing devices of the other members of the peer group, client computing devices 11A, 11B, and 12A, becomes extemporaneously aware that the user of client computing device 12B is now online, that is, without the necessity to establish an online meeting or perform any kind of overt connection action. As soon as presence manager 14 detects or receives the information that client computing device 12B is online, presence manager 14 begins broadcasting the rich presence information from client computing device 12B's EBAY® that represents the group member's experience, in virtual space C, to a thumbnail, or other such display interface, on the user interfaces of client computing devices 11A, 11B, and 12A. This broadcasting by presence manager 14 is performed extemporaneously. It is unsolicited by any of client computing devices 11A, 11B, 12A, and 12B. Thus, not only will the other peer group members extemporaneously see an indication that client computing device 12B is online, the thumbnail (not shown) will stream the entire context of client computing device 12B's EBAY® session that is visible on client computing device 12B. Therefore, any of the other peer group members will be able to see, through the thumbnail, which golf club drivers the group member on client computing device 12B is looking at, what the bids are, and any other piece of information relating to that EBAY® session.

Furthermore, if one of the peer group members, e.g., the member oil client computing device 11A, wishes to join the other peer group member's EBAY® session, he or she would select the thumbnail, after which the navigation information within the rich presence information will allow client computing device 11A to navigate to the same session address as client computing device 12B. Thus, if the group member on client computing device 11A is an expert on golf drivers, he or she may help the member on client computing device 12B select the appropriate one to purchase by actually participating in the group member on client computing device 12B's EBAY® session.

Further, in an additional and/or alternative example from above, a given virtual space (e.g., virtual space A, virtual space B, or virtual space C of FIG. 1A) may be defined as a virtual region that encompasses one or more local applications, as well as one or more websites. Thus, the users who are accessing instances of one or more of those local applications (e.g., one or more types of software development applications) and the users who are accessing one or more of those websites (e.g., a web application for software development) may all be considered as accessing a common virtual space. As an example, suppose a team of software developers of a given company are working on a common project, and further suppose that the software developers are geographically distributed. Moreover, suppose that the software developers choose to use different software development applications for coding or developing their respective portions of the project (e.g., one developer may do his work in Adobe Systems Incorporated's DREAMWEAVER® web development environment to design the framework of a web page, while another user works in Adobe Systems Incorporated's ILLUSTRATOR® graphics design environment to create graphics for the web page, while still another user works in Adobe Systems Incorporated's FLASH® development environment to create some rich content for the web page, as examples). As noted above, a virtual space, such as virtual space A and virtual space B may be defined to encompass various different software development applications. Therefore any of these developers, in the example give with respect to FIG. 1A, who are accessing any of the different software development applications at any given time are extemporaneously connected together and aware of the other developers rich presence information—providing a visual and operational context to the other developers' actions in their respective application sessions.

Should any of these developers then desire to join the application session of any of the other developers, they may simply select the visual interface representing that developer's activity session, which prompts use of the navigation information included with the other developer's rich presence information. Using the navigational information, a screen sharing session is started between the developers such that both may participate in editing or designing the specific project. For examples the developer working in ILLUSTRATOR® may select the session for the developer working in FLASH® in order to join the work session with that developer in FLASH®. The ILLUSTRATOR® developer may be able to help the FLASH® developer design some graphic that he or she is working on in FLASH®. Thus, with practically no set-up costs expended by these group members, each member can easily see and participate in the other members' activities.

According to certain embodiments, presence manager 14 is provided to identify a plurality of users who are members of a common peer group. The peer group may be defined in various ways. For instance, the peer group may be defined to encompass particular employees of a company who are in a common department or who are assigned to a common task project, or the peer group may be defined to encompass particular members who are part of a same family, or the peer group may be defined to encompass members who are accessing a predefined common virtual region, as examples. The criteria for defining these various peer groups are defined by grouping rules or lists at presence manager 14 (e.g., via peer group identifier logic 104). Presence manager 14 extemporaneously initiates communication between the plurality of users identified as members of the peer group as it detects each of these users coming online in order to make each of the other peer group members extemporaneously aware of each other's rich presence information.

In one embodiment, presence manager 14 comprises peer group identifying logic 104 that is operable to identify a plurality of users (e.g., client computing devices 11A and 11B and/or client computing devices 12A and 12B of FIG. 1A) who are members of a common peer group. Again, the peer group identifying logic 104 may employ certain predefined rules and/or information to determine those users who belong to a predefined peer group, and who are thus to be communicatively connected together. Alternatively, there may be lists maintained which specifically identify individual peer groups and individual members of those groups. The implementation of the various embodiments are not limited to any specific means for defining and/or maintaining a record of peer group members.

As further shown in ECS 10, presence manager 14 comprises connection management logic 105 that is operable to extemporaneously manage communication between the plurality of users who are identified as members of a common peer group as those members come online. In certain embodiments, as each group member comes on line, the presence manager 14 begins communication with the communication module, i.e., communication modules 101A-101D, for each online client receiving the rich presence information for each such online client. Presence manager 14, through connection management logic 105, then begins pushing or broadcasting the rich presence information to each of the other group members for presentation. Such extemporaneous initiation of communication by the connection management logic 105 does not require any initiation by any of the users. Thus, in certain embodiments, by mere virtue of the users being identified as part of a common peer group and being detected as online, the peer group members become extemporaneously aware of the rich presence information for the other online members of the group.

In the illustrated example of FIG. 1A, client communication module 101A of client computing device 11A communicates to presence manager 14 information identifying client 11A and client 11A's rich presence information, which includes streaming the context information regarding the location, events, and visual presentation of virtual space A 102A that client computing device 11A is accessing. Similarly, client communication module 101B of client computing device 11B communicates to presence manager 14 information identifying client 11B and streaming the context information regarding the location, events, and visual presentation of virtual space A 102B that client computing device 11B is accessing. Peer group identifying logic 104 processes this information to determine that client computing devices 11A and 11B are members of a common peer group. In certain embodiments, various information may be evaluated to identify the clients as members of a predefined peer group, such as information identifying whether client computing devices 11A and 11B are employees working on a common project and/or have some other relationship to each other, and the like.

Connection management logic 105 then broadcasts the rich presence information received from client computing device 11A to client computing device 11B. Similarly, the rich presence information from client computing device 11B is broadcast to client computing device 11A. Thus, each client can see the user experience of the other group member client by examining the visual representation of the received rich presence information. As presence manager 14 detects client computing devices 12A and 12B coming online, it signals connection management logic 105 to begin broadcasting the rich presence information from client computing devices 11A and 11B to them, and, after receiving the rich presence information from client computing devices 12A and 12B, each instance of rich presence information is sent to the other online group members.

Such communication connection may be a data connection across which the clients communicate their respective rich presence information to presence manager 14, as discussed further herein. In certain embodiments, the communication connection established is a persistent communication connection across which updated rich presence data for a given peer group member is communicated to other peer group members in real-time as the given peer group member's rich presence data changes (e.g., as the given peer group member browses from one virtual space, or portion thereof, to another). In other embodiments, the communication connection may not be a persistent connection, but may instead be reestablished between a given peer group member and all other peer group members through presence manager 14 each time that updated rich presence data is to be communicated to those peer group members. In addition, in certain embodiments, the communication connection may further comprise a voice connection (e.g., VOIP connection) that enables the peer group members to verbally speak with each other, such as described in co-pending and commonly assigned U.S. patent application Ser. No. 12/038,656 titled "SYSTEMS AND METHODS FOR ENABLING COMMUNICATION BETWEEN USERS OF COMMON VIRTUAL SPACES" filed Feb. 27, 2008, the disclosure of which is hereby incorporated herein by reference.

In this way, the determined peer group members (clients 11A and 11B) are extemporaneously coupled together without requiring any connection actions by the individual users for actively initiating the communication connections with other peer group members. Once the communication connections are formed, each peer group member becomes aware of the rich presence information of each other peer group member that being shared with the group.

In certain embodiments, peer group identifying logic 104 and connection manager 105 may work together (using information received from the clients) to determine when to connect peer group members together. For instance, in certain embodiments, presence manager 14 detects when a client is online, whereupon presence manager 14 initiates the above-mentioned communication connection with the client communication modules of those clients that are detected as being online. Similarly, when a client goes offline (e.g., signs off of the computing device and/or departs a particular virtual space/region), the client's communication module communicates that information to presence manager 14, which, in turn, terminates the communication connection of that client from other peer group members to which the client was connected. As such, no action is required by the user when going offline to terminate the communication connection, but instead this termination may be handled by presence manager 14 and/or client communication module 105.

Figure 1B:
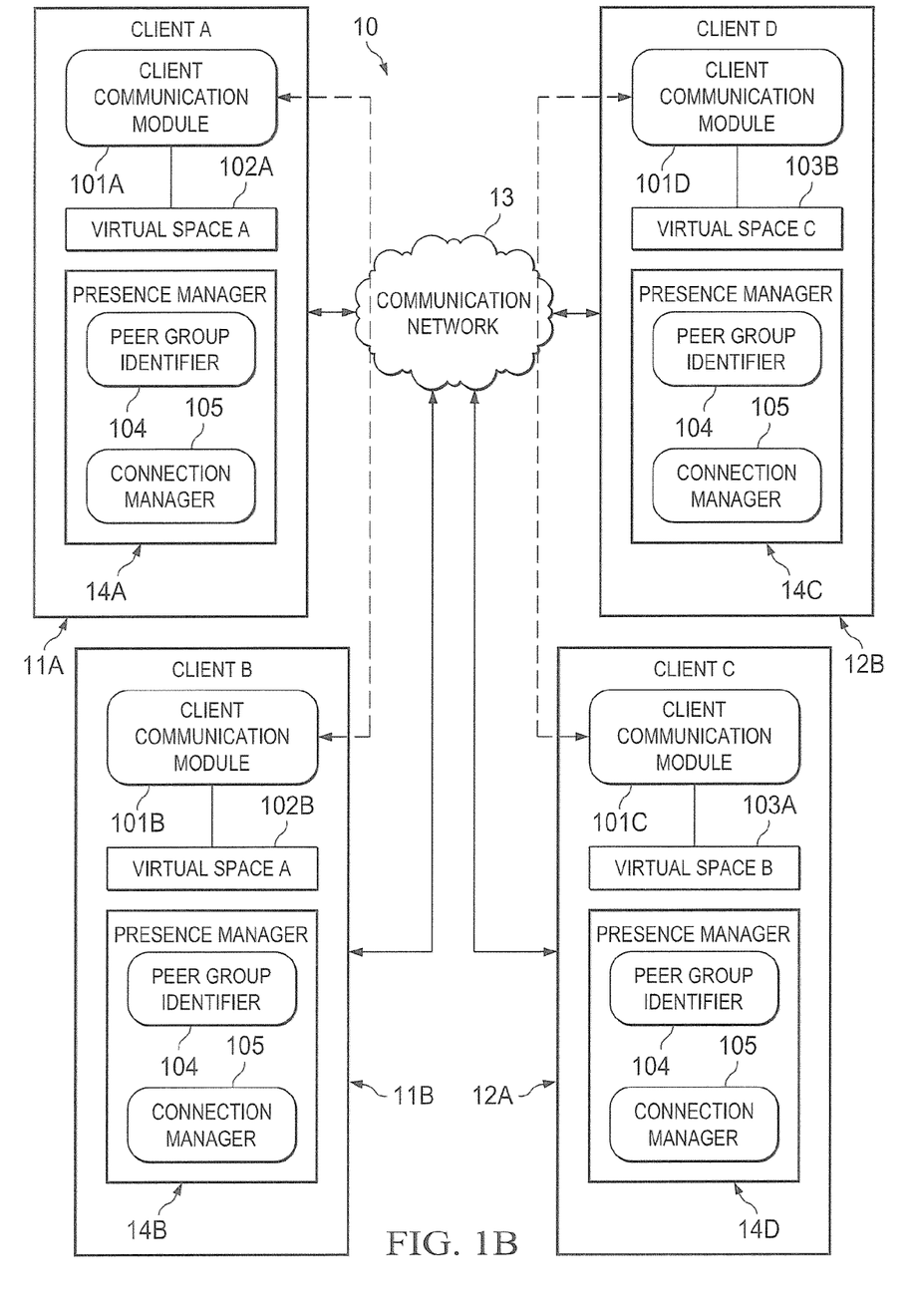
FIG. 1B shows another block diagram of an exemplary system according to an embodiment, which illustrates that the presence manager may be implemented in a distributed manner.

While presence manager 14 is shown as a separate block for ease of illustration in FIG. 1A, it should be understood that presence manager 14 is not limited to being implemented as a centralized server. Rather, all or a portion of presence manager 14 may be implemented in a distributed manner, such as illustrated in the exemplary block diagram of FIG. 1B. For instance, all of presence manager 14 or select client-side parts thereof (e.g., peer group identifier 104 and/or connection manager 105) may be loaded onto the client computers (e.g., may be downloaded to the clients from a server or otherwise installed onto the client computers), as illustrated with presence managers 14A-14D loaded on the client computing devices 11A, 11B, 12A, and 12B in the example of FIG. 1B. The functions performed by presence managers 14A-14D when implemented in such a distributed fashion are largely as described herein for presence manager 14 (FIG. 1A), and such distributed implementation may be enabled through use of any suitable underlying P2P communication scheme.

It should be noted that in still other additional and/or alternative embodiments, presence manager 14 (FIG. 1A) may also be distributed across one or more servers. The various embodiments are not intended to be limited by and specific configuration and any such architectural implementation of the presence manager 14 is intended to be within the scope of the present application.

Figure 2:
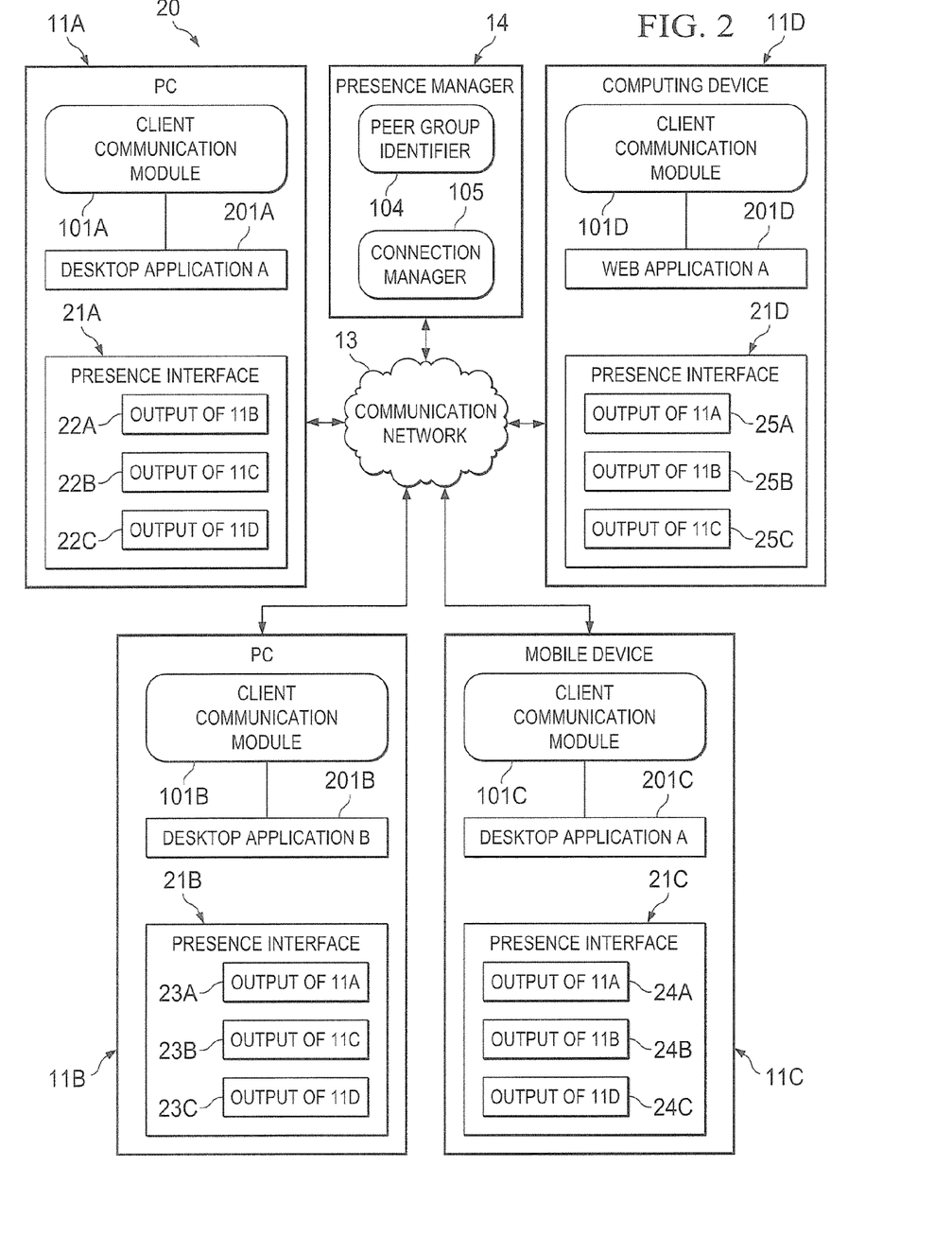
FIG. 2 shows a block diagram illustrating an exemplary scenario of peer group members accessing virtual spaces according to certain embodiments.

FIG. 2 shows a block diagram illustrating ECS 20 configured according to one embodiment. In an example operation of ECS 20, client devices 11A-D communicate via communication network 13, where client device computing devices 11A and 11C are each executing desktop applications A 201A and 201C, while client device 11B is executing desktop application B 201B and client device 11D is accessing web application A 201D. In this example, client devices 11A and 11B are personal computers (PCs), while client device 11C is a mobile computing device (e.g., a laptop. PDA, mobile telephone, handheld gaming device, etc.) and client device 11D is another computing device (which may be a PC, mobile computing device, etc.).

The client communication module 101A-101D of each of the client computing devices 11A-11D communicates information to presence manager 14 identifying the corresponding client and, in some embodiments, indicating the virtual space being accessed by the client. In response, peer group identifying logic 104 of communication manager server 14 forms the client computing devices 11A-11D into a peer group. Further, connection management logic 105 causes the client communication modules 101A-101D to communicatively connect the client computing devices 11A-11D together.

In addition, as shown in this example, once the communication connections are formed between the peer group members, each member's respective rich presence information is communicated to the other peer group members via such communication connection. And, a rich presence interface may be presented on each peer group member's computing device, which outputs information identifying the other peer group members who are currently online and provide a graphical context of the specific user experience that the other peer group members are participating in on their respective devices. This graphical context, defined by the rich presence information, may be displayed in a thumbnail, or other such user interface element, that presents a graphical view of the corresponding output display of each of the other peer group members.

In the illustrated example of FIG. 2, rich presence interface 21A is presented on client computing device 11A, which displays rich presence information for the other peer group members on client computing devices 11B-11D. For instance, rich presence interface 21A includes graphical outputs 22A-22C which display the current output of the other peer group members on client computing devices 11B-11D, respectively. In addition, further information may be presented in association with each of the graphical outputs 22A-22C to identify the corresponding other peer group member to whom the respective graphical output corresponds, such as by presenting a name or other "handle" identifying each of the other peer group members. Thus, as client computing device 11A receives (via client communication module 101A) rich presence information from the other peer group members via presence manager 14, it updates the corresponding graphical outputs 22A-22C of presence interface 21A. Accordingly, graphical outputs 22A-22C are updated in real-time to reflect the current output being presented to each of the other peer group members, thus enabling the user of client computing device 11A to see where those other peer group members are virtually located and what those other peer group members are doing at a given time within a virtual space/region. Thus, for instance, graphical output 22A may present the current output display being presented to client computing device 11B (e.g., from desktop application 201B), graphical output 22B may present the current output display being presented to client computing device 11C (e.g., from desktop application 201C), and graphical output 22C may present the current output display being presented to client computing device 11D (e.g., from desktop application 201D).

Similarly, rich presence interface 21B is presented on client computing device 11B, which outputs presence information for the other peer group members at client computing devices 11A, 11C, and 11D. For instance, presence interface 21B includes graphical outputs (e.g., thumbnails) 23A-23C which display the current output (e.g. screen shots) of the other peer group members operational sessions on client computing devices 11A, 11C, and 11D, respectively. In addition, further information may be presented in association with each of the graphical outputs 23A-23C to identify the name or identity of the corresponding other peer group member to whom the respective graphical output corresponds, such as by presenting a name or other "handle" identifying each of the other peer group members. Thus, as client computing device 11B receives rich presence information from the other peer group members, it updates the corresponding graphical outputs 23A-23C of rich presence interface 21B. Accordingly, graphical outputs 23A-23C are updated in real-time to reflect the current output being presented to each of the other peer group members, thus enabling the user of client computing device 11B to see where those other peer group members are located at a given time within a virtual space/region. Similarly, rich presence interface 21C is presented on client computing device 11C and includes graphical outputs (e.g., thumbnails) 24A-24C which display the current output (e.g. screen shots) of the other peer group members operational sessions on client computing devices 11A, 11B and 11D. Likewise, rich presence interface 21D is presented on client computing device 11D and includes graphical outputs (e.g., thumbnails) 25A-25C which display the current output (e.g. screen shots) of the other peer group members operational sessions on client computing devices 11A, 11B and 11C.

Figure 3:
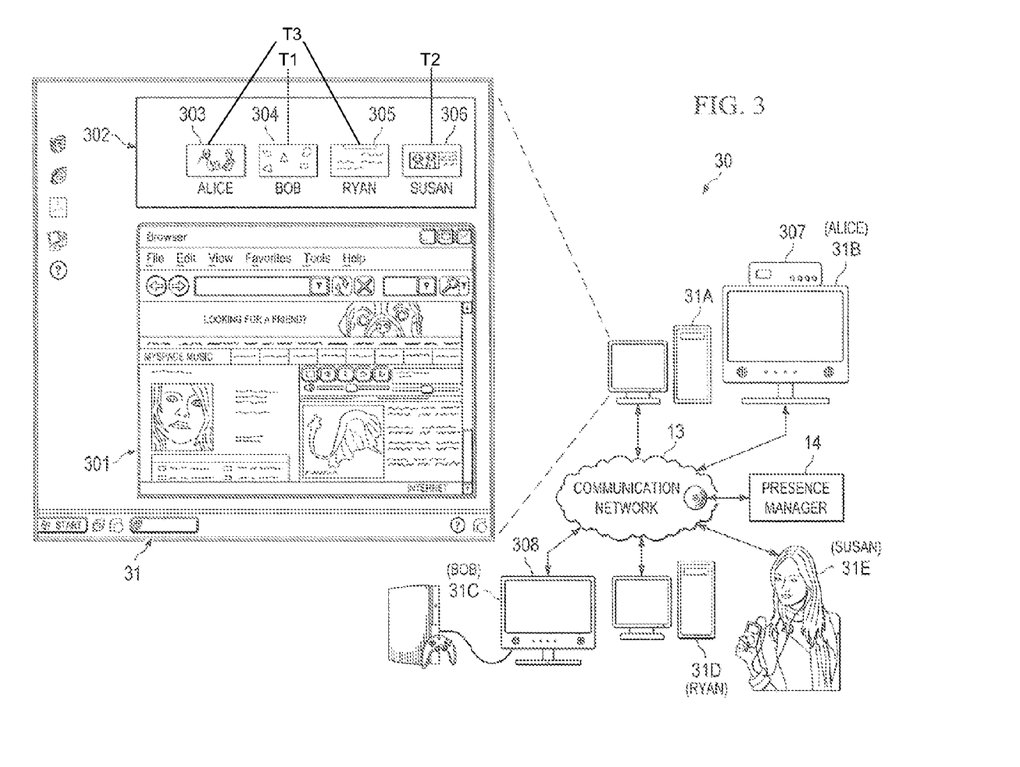
FIG. 3 is an illustration of an exemplary system adapted according to one embodiment, which presents a graphical user interface to each of the members of a peer group, where the user interface identifies the current presence of each of the other members of the peer group.

Turning now to FIGURE, a block diagram illustrates ECS 30 configured according to one embodiment. At time, T1, the user of computer 31A starts up and accesses the internet through browser application 301. On start-up, however, at time T1, the client communication module in computer 31A sends start-up information to presence manager 14 in communication network 13. 'file start-up information provides identification information for the user, which presence manager 14 uses to determine membership in any known groups, and the stream of rich presence information from computer 31A. As computer continues its start up, it receives rich presence information from presence manager 14 representing other group members user experiences, This rich presence information is being presented through thumbnails 303 and 305 in group list display 302. The user at computer 31A has taken no action to request or set up this information. Code within the client communication module knows to perform this communication merely on start-up of computer 31A.

Thumbnail 303 represents the user experience currently being enjoyed by Alice, at television 31B. Alice is in the same peer group as the user of computer 31A. Thumbnail 303 displays the particular television show that Alice is currently watching. Set-top box 307 includes a computer processor and memory that includes a client communication module that communicates rich client information with presence manager 14. Presence manager 14 broadcasts the rich presence information comprising Alice's television show to all of the online group members. Thus, the user at computer 31A receives this information and the television show is displayed at thumbnail 303. If the user at computer 31A desired to view Alice's user experience, he or she would select thumbnail 303, after while the navigation information contained within the rich presence information would direct computer 31A to open a new interface window within which to play the television show currently being watched by Alice at television 31B. Depending on the interactive capabilities of set-top box 307, the user at computer 31A may be able to communicate with Alice through television 31A.

Also at time T1, computer 31A displays thumbnail 305 representing the rich presence information from Ryan at computer 31D. Ryan is also in the same peer group and computer 31D is in communication with presence manager 14, transmitting the rich presence information from Ryan's computer experience to presence manager 14 which turns around and broadcasts this rich presence information to the other online members of the group. As such, the user at computer 31A receives this visual context information which is displayed in thumbnail 305. Again, the user at computer 31A has performed no overt actions to initiate communication with or collaboration with Alice and Ryan, computer 31A simply becomes extemporaneously aware of Alice's and Ryan's rich presence information and displays that information visually in thumbnails 303 and 305, as computer 31A starts up at time T1.

If the user at computer 31A desires to more directly collaborate with Ryan, he or she would select thumbnail 305 to initiate an electronic collaboration. In this example, Ryan is operating a graphics editing environment, such as Adobe Systems Incorporated's PHOTOSHOP®, locally on computer 31D. Thus, in this example embodiment, a screen sharing application is initiated that places the user of computer 31A and Ryan in a virtual meeting room in which Ryan's executing instance of PHOTOSHOP® is being shared. In one example embodiment, the code underlying the screen sharing application is built into the client communication modules within each client of the peer group. In additional examples, a separate application, such as ACROBAT® CONNECT™, may be executed in order to implement the screen sharing. The various embodiments are not limited to any particular means at providing this screen sharing function. Thus, as the user at computer 31A and Ryan enter a screen sharing session, they may collaborate directly on Ryan's work within PHOTOSHOP®.

At time T2, Susan, who is also a member of the same peer group, starts up her wireless-enabled music player (WEMP) 31E. As WEMP 31E starts up, the client communication module built into WEMP 31E establishes communication with presence manager 14 over communication network 13 and being transmitting its rich presence information to presence manager 14. The rich presence information transmitted by WEMP 31E includes the audio media that Susan is listening to as well as any additional data, such as album cover art, lyrics, artist information, or the like. Presence manager 14 then broadcasts the rich presence information to the other online group members. Computer 31A receives this rich presence information and displays the graphical representation through thumbnail 306 of group list display 302. Again, the user at computer 31A has taken no action to find Susan. Computer 31A simply becomes extemporaneously aware that Susan has come online, expands group list display 302 enough to accommodate thumbnail 306, and displays thumbnail 306 reflecting the graphical representation of the rich presence information from WEMP 31E.

In the embodiment illustrated, only the graphical representations of the rich presence information from WEMP 31E are displayed. If the user of computer 31A desires to hear what Susan is listening to, he or she would rollover thumbnail 306, which triggers thumbnail 306 to begin playing the audio portion of the rich presence information as well. By limiting when any audio portions of the rich presence information is played, the user at computer 31A will not be distracted by any background noise. If the user at computer 31A desires to virtually join Susan, he or she would select thumbnail 306, after which the navigation information that is a part of the rich presence information would direct computer 31A to open a new window and begin playing the same audio that Susan is listening to on WEMP 31E. Depending on the interactivity capabilities of WEMP 31E, the user at computer 31A may be able to communicate with Susan as well.

At time T3, Bob, who is also a member of the same peer group, begins playing a game on game console 31C. As Bob starts up game console 31C, the client communication module within game console 31C communicates Bob's identity information and the rich presence information from game console 31C to presence manager 14. Presence manager 14 then broadcasts the rich presence information from game console 31C to the other members of the peer group. At computer 31A, group list display 302 is extemporaneously expanded again to accommodate thumbnail 304, which displays the graphical representations of the rich presence information that Bob is seeing on game monitor 308. Thus, the user at computer 31A is able to see Bob's game play. Again, as before, the user at computer 31A does not perform any overt action in order to see that Bob is online or to see what Bob is doing online. Instead, computer 31A becomes extemporaneously aware that Bob is online and sees what he is doing at that particular point in time.

If the user at computer 31A desires to join Bob, he or she would select thumbnail 304, after which computer 31A would use the navigational information within the rich presence information to navigate to the game. Navigating to the game may be implemented in various different ways. For example, a screen sharing application may be used so that the user at computer 31A and Bob can both interact in Bob's game play. Another possibility would be, if a copy of the game code resides on computer 31A, computer 31A could execute the game and bring the game to the same execution point as Bob. Additionally, because a second game instance is running on computer 31A, the user could play the game with Bob, instead of merely interacting with Bob's playing instance. Still another possibility would be that, if the game included a distributed play capability, computer 31A could access the online portion of the game and use the navigation information to place the online game at the same point at which Bob is playing. Again, in this optional method, the user at computer 31A could play his or her own game play instance and play with Bob. The various embodiments are not limited to any method for connecting peer group members to such games.

It should be noted that in additional and/or alternative embodiments, presence manager 14 is utilized to define peer groups and communicate information to members of the peer groups regarding, for instance, which members are presently online (e.g., accessing a predefined virtual space/region). However, once the peer groups are established, the members who are autonomously connected together can readily communicate with each other (e.g., via VOIP, sharing authored content, sharing presence information, etc.) without such communication being required to flow through presence manager 14. That is, once presence manager 14 updates the members as to which members are currently connected together, their respective presence information may be communicated directly between each other via the connections established between their respective communication modules.

It should be noted that in additional and/or alternative embodiments, users may setup profiles that specify their individual preferences regarding communication with other users. Such profiles may be in the form of digital data stored to a computer-readable medium as any suitable data structure (e.g., flat file, table, database, spreadsheet, and the like). Thus, the profile information may be read by a computer device. For instance, the profile may specify whether and/or when (e.g., under what conditions) the user is to be autonomously connected with other members of a determined peer group. The profile may further specify what rich "presence" information for the given user is to be shared with other members of a peer group. For example, a user may specify that certain information is to be shared with co-workers, while other information is to be shared with family members.

In one exemplary embodiment, user profile data (such as user profile data 52 shown and described in conjunction with FIG. 5 of co-pending and commonly assigned U.S. patent application Ser. No. 12/038,656 titled "SYSTEMS AND METHODS FOR ENABLING COMMUNICATION BETWEEN USERS OF COMMON VIRTUAL SPACES" filed Feb. 27, 2008, the disclosure of which is hereby incorporated herein by reference) is stored to a computer-readable medium, which is communicatively accessible by presence manager 14. For instance, as shown, respective profile information may be stored for each of clients 11A-11B and 12A-12B of FIGS. 1A-1B.

The profile information may comprise a variety of information regarding the communication preferences of a corresponding user (e.g., whether or under what conditions to connect with other peer group members, what information to exchange with other members in a peer group, and the like) and/or regarding information corresponding to the user, such as the user's personal information, and the like. For example, in certain embodiments, the profile may specify what information (e.g., identification information, personal information, and the like) is to be communicated to other users in a given peer group. Various rules may be defined in the profiles, and presence manager 14 may follow the user-specified rules in determining whether to extemporaneously connect a given user to other members of a determined peer group and/or in determining what information to communicate from the user to other members of the determined peer group. For instance, in certain embodiments, identification information may be communicated to other members of a peer group with whom the given user is connected, whereby the identification information may be presented on a user interface to the other members.

The profile information may be setup directly with presence manager 14 in certain embodiments (e.g., by a user interacting with a user interface provided by the presence manager 14 to input the information), while in other embodiments all or a portion of the profile information may be inherited by the presence manager 14 from another source. For example, a web server may host a website with which a user may establish a user profile for a given website that specifies the user's preferences, personal information, etc. The web server may share the profile information with presence manager 14 (e.g., by enabling presence manager 14 access to the web server's user profile information). The website may be defined as a virtual space, and the presence manager 14 may utilize the user's preferences defined in the corresponding profile for that website hosted by web server in managing the communication connection and information communicated to other users when the user is accessing this defined virtual space.

In this manner, the user may define different profiles for different virtual spaces (e.g., different websites), and the presence manager 14 inherits those profiles and employs them to manage the user's communication accordingly in each of the virtual spaces. For example, a user may setup a first profile for a virtual space that the user shares with friends and/or family members (e.g., www.myfamily.com) in which the user specifies to share a first set of information with users in that virtual space (e.g., sharing personal information, etc.), and the user may setup a second profile for a virtual space that the user shares with co-workers (e.g., a software development application space) in which the user specifies to share a second set of information with users in that virtual space (e.g., which does not share certain personal information).

As discussed further herein, according to one exemplary embodiment, during a user's browsing experience (e.g., when browsing the web using a client-side browser), a sidebar rich "presence" interface may be presented on the user's desktop, which presents to the user thumbnails of web pages that members of his/her peer group (e.g., friends, family members, etc.) are accessing at that moment. The thumbnails present a rich view of the output display of each of the other peer group members, and the thumbnails update as the peer group members browse from page to page. That is, presence information is communicated (e.g., in real-time) among the peer group members to update each member regarding the current rich "presence" in a virtual space.

All or a portion of the presence manager 14 and/or the client communication modules (e.g., modules 101A-101D of FIG. 1) may be implemented in the client's browser application, in certain embodiments. In other embodiments, all or a portion of the presence manager 14 and/or the client communication modules (e.g., modules 101A-101D of FIG. 1) may be implemented as a separate application executing on the client's computing device.

For defining a peer group, in certain embodiments, the users may subscribe to join a peer group or otherwise agree to exchange their respective presence information with other members of a given peer group. Thus, according to certain embodiments, the members have a pre-established relationship and they have agreed to shared data about each other. As discussed further herein, such agreement and/or rules regarding the information to be exchanged may be established in user profiles that are accessible by the presence manager 14.

In certain embodiments, a history may be maintained for each peer group member. For instance, in addition to displaying to a first peer group member the current presence information for other peer group members, a historical log of the past presence information for the other peer group members may be maintained such that the first peer group member may be able to review (and, in some instances, communicatively access) the virtual spaces previously visited by the other peer group members.

As described further herein, a client communication module is loaded to each client, which is operable to interact with the communication manager 14 and establish the communication connections with the peer group members identified by the communication manager 14. Any suitable communication module may be employed on the clients, but such module is preferably sufficiently light-weight to enable wide adoption across many different platforms and devices.

According to one embodiment, the client communication module comprises an architecture that provides a web browser based SIP (session initiation protocol) agent implemented on a FLASH® platform. As a user starts up his or her client device, a hidden FLASH® player instance is invoked which begins a SIP connection to an associated ADOBE® FLASH® Media Server from Adobe Systems Incorporate. This corresponds to the client-side communication module transmitting identification information and the rich presence information to the presence manager (FIGS. 1A and 2). The FLASH® Media Server includes implementations of the presence manager logic (FIGS. 1A and 2) including the peer group identification logic and connection manager (FIGS. 1A and 2). Thus, on receiving the identification information the FLASH® Media Server determines which, if any, peer groups this client belongs to, and, if any other members of this client's peer group are online, begins broadcasting the streaming rich presence information to instances of the FLASH® player operating on those peer group devices. At the client side, the associated FLASH® player receives the streaming rich client information for each other online group member and plays that streaming information in additional FLASH® player instance containers so that the visual context of each other group member can be seen and, because of the interactive capabilities of FLASH®, interacted with by the viewing group member.

The architecture further comprises a standards compliant SIP stack and media engine. The architecture also provides the above-mentioned voice communication capability, presence capability (e.g., information about agent availability, queue length, department, account status, and the like), and instant messaging (IM) capability for text chat and web share by the agent and the caller. An exemplary architecture of such a client communication module that may be implemented in certain embodiments is shown in FIG. 6 of co-pending and commonly assigned U.S. patent application Ser. No. 12/038, 656 titled "SYSTEMS AND METHODS FOR ENABLING COMMUNICATION BETWEEN USERS OF COMMON VIRTUAL SPACES" filed Feb. 27, 2008, the disclosure of which is hereby incorporated herein by reference. Of course, the concepts presented herein are not limited to the client communication module architecture of such FIG. 6 of copending and commonly assigned U.S. patent application Ser. No. 12/038,656, but may instead employ any suitable communication architecture to support the operations described herein for such module.

It should be noted that in additional and/or alternative embodiments implemented using P2P technology. All of the functionality maintained at the FLASH® Media Server that implements the presence manager, including the peer group identification logic and connection manager, would be included in the client-side FLASH® player. Thus, the local FLASH® player would attempt to find other connected FLASH® players and use the presence manager to determine if any such clients operating the discovered FLASH® players are members of the same peer group. If so, communication connections are established between the FLASH® players on the online group member devices and the rich presence information is broadcast to each other group member to be displayed in the thumbnails, or other interface elements, established by additional FLASH® player instance containers.

It should further be noted that additional and/or alternative embodiments may be implemented using other communication applications. The various embodiments are not limited to implementation only through FLASH® technology.

Figure 4:
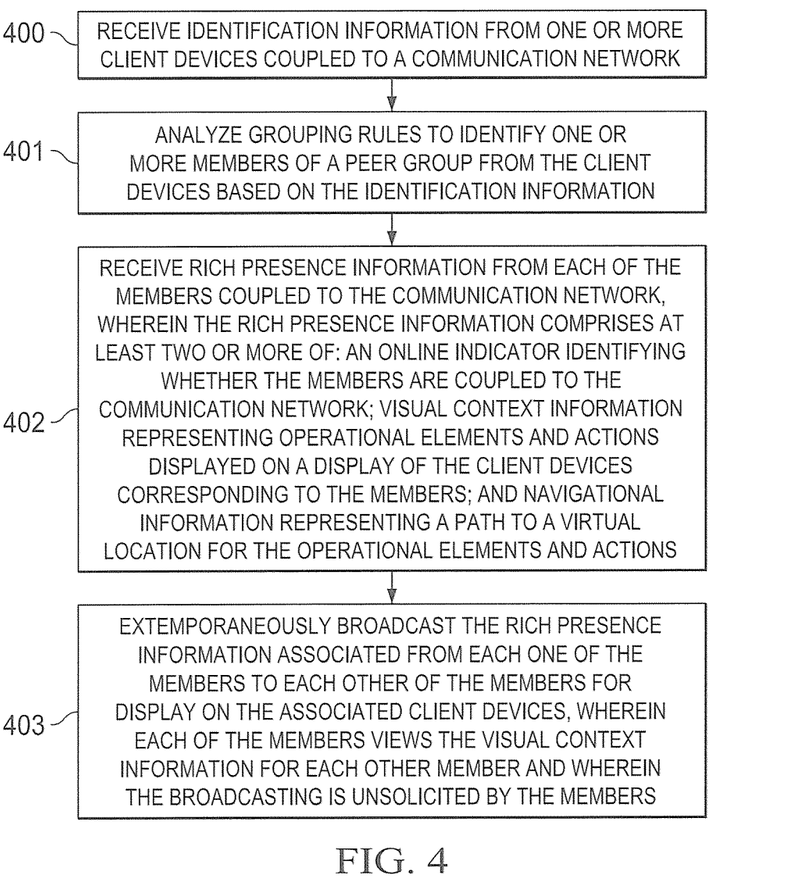
FIG. 4 shows an exemplary operational flow diagram according to one embodiment.

FIG. 4 shows an exemplary operational flow diagram according to one embodiment. In operational block 400, identification information is received from one or more client devices coupled to a communication network. Grouping rules are analyzed, in operational block 401, to identify one or more members of a peer group from the client devices based on the identification information. In operational block 402, rich presence information is received from each of the members coupled to the communication network, wherein the rich presence information comprises at least two or more of: an online indicator identifying whether the members are coupled to the communication network; visual context information representing operational elements and actions displayed on a display of the client devices corresponding to the members; and navigational information representing a path to a virtual location for the operational elements and actions. In operational block 403, the associated rich presence information is extemporaneously broadcast from each one of the members to each other of the members for display on the associated client devices, wherein each of the members views the visual context information for each other member and wherein the broadcasting is unsolicited by the members.

Embodiments, or portions thereof, may be embodied in program or code segments operable upon a processor-based system (e.g., computer system) for performing functions and operations as described herein. The program or code segments making up the various embodiments may be stored in a computer-readable medium, which may comprise any suitable medium for temporarily or permanently storing such code. Examples of the computer-readable medium include such physical computer-readable media as an electronic memory circuit, a semiconductor memory device, random access memory (RAM), read only memory (ROM), erasable ROM (EROM), flash memory, a magnetic storage device (e.g., floppy diskette), optical storage device (e.g., compact disk (CD), digital versatile disk (DVD), etc.), a hard disk, and the like.

Embodiments, or portions thereof, may be embodied in a computer data signal, which may be in any suitable form for communication over a transmission medium such that it is readable for execution by a functional device (e.g., processor) for performing the operations described herein. The computer data signal may include any signal that can propagate over a transmission medium such as electronic network channels, optical fibers, air, electromagnetic media, radio frequency (RF) links, and the like, and thus the data signal may be in the form of an electrical signal, optical signal, radio frequency or other wireless communication signal, etc. The code segments may, in certain embodiments, be downloaded via computer networks such as the Internet, an intranet, a local area network (LAN), a metropolitan area network (MAN), a wide area network (WAN), the public switched telephone network (PSTN), a satellite communication system, a cable transmission system, and/or the like.

Figure 5:
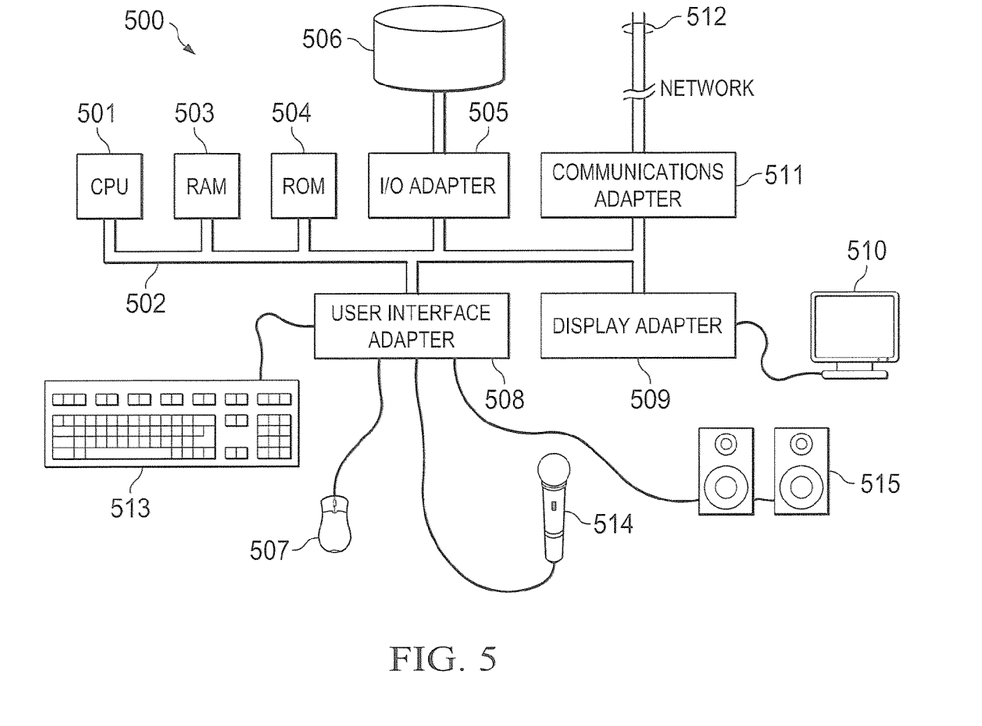
FIG. 5 shows an exemplary system on which embodiments may be implemented.

FIG. 5 illustrates an exemplary computer system 500 which may be employed to implement presence manager 14 and/or one or more of the client computing devices according to certain embodiments. Thus, peer group identifying logic 104, connection management logic 105, and/or client communication module (e.g., module 101A of FIG. 1) may be implemented on such exemplary computer system 500 according to one embodiment. Central processing unit (CPU) 501 is coupled to system bus 502. CPU 501 may be any general-purpose CPU. The present disclosure is not restricted by the architecture of CPU 501 (or other components of exemplary system 500) as long as CPU 501 (and other components of system 500) supports the inventive operations as described herein. CPU 501 may execute the various logical instructions described herein. For example, CPU 501 may execute machine-level instructions according to the exemplary operational flow described above in conjunction with FIG. 4.

Computer system 500 also preferably includes random access memory (RAM) 503, which may be SRAM, DRAM, SDRAM, or the like. Computer system 500 preferably includes read-only memory (ROM) 504 which may be PROM, EPROM, EEPROM, or the like. RAM 503 and ROM 504 hold user and system data and programs, as is well known in the art.

Computer system 500 also preferably includes input/output (I/O) adapter 505, communications adapter 511, user interface adapter 508, and display adapter 509. I/O adapter 505, user interface adapter 508, and/or communications adapter 511 may, in certain embodiments, enable a user to interact with computer system 500 in order to input information, such as interacting with a user interface provided by a given virtual space being accessed by the user, as described above.

I/O adapter 505 preferably connects to storage device(s) 506, such as one or more of hard drive, compact disc (CD) drive, floppy disk drive, tape drive, etc. to computer system 500. The storage devices may be utilized when RAM 503 is insufficient for the memory requirements associated with storing data for operations of peer group identifying logic 104, connection management logic 105, and/or client communication module 101A. Communications adapter 511 is preferably adapted to couple computer system 500 to network 512, which may enable information to be input to and/or output from system 500 via such network 512 (e.g., the Internet or other wide-area network, a local-area network, a public or private switched telephony network, a wireless network, any combination of the foregoing). User interface adapter 508 couples user input devices, such as keyboard 513, pointing device 507, and microphone 514 and/or output devices, such as speaker(s) 515 to computer system 500. Display adapter 509 is driven by CPU 501 to control the display on display device 510 to, for example, display a presence interface and/or other information desired to be displayed, as discussed herein.

It shall be appreciated that the present disclosure is not limited to the architecture of system 500. For example, any suitable processor-based device may be utilized for implementing presence manager 14 and/or client computing devices, including without limitation personal computers, laptop computers, computer workstations, multi-processor servers, and even mobile telephones. Moreover, certain embodiments may be implemented on application specific integrated circuits (ASICs) or very large scale integrated (VLSI) circuits. In fact, persons of ordinary skill in the art may utilize any number of suitable structures capable of executing logical operations according to the embodiments.

Although embodiments and advantages have been described in detail, it should be understood that various changes, substitutions and alterations can be made herein without departing from the spirit and scope of the concepts defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized within the scope of the present application. Accordingly, the appended claims are intended to include within their scope such processes, machines, manufacture, compositions of matter, means, methods, or steps.

What is claimed is:

1. A method comprising:
    receiving, at a computing device on a communication network, rich presence information from each of a plurality of devices coupled to the communication network, the rich presence information comprising, for respective ones of the plurality of devices, visual context information depicting operational elements, user interactions with content currently displayed on a display of the device, and navigational information representing a session address for a virtual location of the operational elements and the user interactions;
    displaying thumbnail images associated with the plurality of devices, each thumbnail image comprising visual context information for one of the plurality of devices;
    receiving a selection of a thumbnail image comprising visual context information depicting a session comprising use of an application at a selected device; and
    using the navigational information to establish a sharing session between the computing device and the selected device, the sharing session comprising electronic collaboration using the application to display and interact with a same instance of the content at the virtual location, wherein user interactions by either a user of the computing device and a user of the selected device are displayed on both devices in the sharing session.

2. The method of claim 1 wherein a user at the computing device and a second user at the selected device share use of the application and use of the same instance of the content at the virtual location, the virtual location being distinct from the computing device and the selected device.

3. The method of claim 1, wherein selections of multiple thumbnails images are received and multiple sharing sessions established, each sharing session established between the computing device and a respective device associated with a selected thumbnail image using the navigational information for the respective device.

4. The method of claim 1, further comprising:
    receiving a request from an initiating device to establish a requested sharing session between the computing device and the initiating device using the navigational information for the initiating device, the requested sharing session comprising electronic collaboration using the application at the initiating device, wherein the initiating device is one of the multiple devices; and
    responsive to receiving the request, joining the requested sharing session.

5. The method of claim 1, wherein the rich presence information further comprises audio information.

6. The method of claim 1, wherein receiving rich presence information from each of the multiple devices is unsolicited.

7. The method of claim 1, wherein receiving rich presence information from each of the multiple devices occurs in real time.

8. The method of claim 1 wherein the application is a screen sharing application that displays visual context information of the selected device and visual context information of the computing device.

9. A computing device comprising a processor and a non-transitory computer-readable medium, wherein the non-transitory computer-readable medium embodies one or more program components that configure the computing device to carry out operations, comprising:
    receiving rich presence information from each of a plurality of devices coupled to a communication network, the rich presence information comprising, for respective ones of the plurality of devices, visual context information depicting operational elements, user interactions with content currently displayed on a display of the device, and navigational information representing a session address for a virtual location of the operational elements and the user interactions;
    displaying thumbnail images associated with the plurality of devices, each thumbnail image comprising visual context information for one of the plurality of devices;
    receiving a selection of a thumbnail image comprising visual context information depicting a session comprising use of an application at a selected device; and
    using the navigational information to establish a sharing session between the computing device and the selected device, the sharing session comprising electronic collaboration using the application to display and interact with a same instance of the content at the virtual location, wherein user interactions by either a user of the computing device and a user of the selected device are displayed on both devices in the sharing session.

10. The system of claim 9, wherein a user at the computing device and a second user at the selected device share use of the application and use of the same instance of the content at the virtual location, the virtual location being distinct from the computing device and the selected device.

11. The system of claim 9, wherein selections of multiple thumbnails images are received and multiple sharing sessions established, each sharing session established between the computing device and a respective device associated with a selected thumbnail image using the navigational information for the respective device.

12. The system of claim 9, further comprising:
    receiving a request from an initiating device to establish a requested sharing session between the computing device and the initiating device using the navigational information for the initiating device, the requested sharing session comprising electronic collaboration using the application at the initiating device, wherein the initiating device is one of the multiple devices; and responsive to receiving the request, joining the requested sharing session.

13. The system of claim 9, wherein the rich presence information further comprises audio information.

14. The system of claim 9, wherein receiving rich presence information from each of the multiple devices is unsolicited.

15. The system of claim 9, wherein receiving rich presence information from each of the multiple devices occurs in real time.

16. The system of claim 9 wherein the application is a screen sharing application that displays visual context information of the selected device and visual context information of the computing device.

17. A computer program product comprising a non-transitory computer-readable medium embodying program instructions, the program instructions comprising:

program instructions for receiving, at a computing device on a communication network, rich presence information from each of a plurality of devices coupled to the communication network, the rich presence information comprising, for respective ones of the plurality of devices, visual context information depicting operational elements, user interactions with content currently displayed on a display of the device, and navigational information representing a session address for a virtual location of the operational elements and the user interactions;

program instructions for displaying thumbnail images associated with the plurality of devices, each thumbnail image comprising visual context information for one of the plurality of devices;

program instructions for receiving a selection of a thumbnail image comprising visual context information depicting a session comprising use of an application at a selected device; and program instructions for using the navigational information to establish a sharing session between the computing device and the selected device, the sharing session comprising electronic collaboration using the application to display and interact with a same instance of the content at the virtual location, wherein user interactions by either a user of the computing device and a user of the selected device are displayed on both devices in the sharing session.

18. The computer program product of claim 17, wherein a user at the computing device and a second user at the selected device share use of the application and use of the same instance of the content at the virtual location, the virtual location being distinct from the computing device and the selected device.

19. The computer program product of claim 17, wherein selections of multiple thumbnails images are received and multiple sharing sessions established, each sharing session established between the computing device and a respective device associated with a selected thumbnail image using the navigational information for the respective device.

20. The computer program product of claim 17, further comprising:

program instructions for receiving a request from an initiating device to establish a requested sharing session between the computing device and the initiating device using the navigational information for the initiating device, the requested sharing session comprising electronic collaboration using the application at the initiating device, wherein the initiating device is one of the multiple devices; and program instructions for responsive to receiving the request, joining the requested sharing session.

21. The computer program product of claim 17, wherein the rich presence information further comprises audio information.

22. The computer program product of claim 17, wherein receiving rich presence information from each of the multiple devices is unsolicited.

23. The computer program product of claim 17, wherein receiving rich presence information from each of the multiple devices occurs in real time.

24. The computer program product of claim 17, wherein the application is a screen sharing application that displays visual context information of the selected device and visual context information of the computing device.

* * * * *